(12) United States Patent
Tran

(10) Patent No.: US 8,669,880 B2
(45) Date of Patent: Mar. 11, 2014

(54) METHOD AND APPARATUS FOR PREVENTING OVERHEATING OF A COMPUTER

(75) Inventor: Teresa Tran, San Diego, CA (US)

(73) Assignee: Sony Corporation, Tokyo (JP)

( * ) Notice: Subject to any disclaimer, the term of this patent is extended or adjusted under 35 U.S.C. 154(b) by 181 days.

(21) Appl. No.: 13/180,223

(22) Filed: Jul. 11, 2011

(65) Prior Publication Data

US 2013/0015978 A1 Jan. 17, 2013

(51) Int. Cl.
*G08B 21/00* (2006.01)

(52) U.S. Cl.
USPC ................ 340/657; 340/691.6; 340/584

(58) Field of Classification Search
USPC ............. 340/657, 540, 584, 635, 638, 655, 340/652–654, 640, 662, 691.6, 692
See application file for complete search history.

(56) References Cited

U.S. PATENT DOCUMENTS

| 5,175,672 | A | * | 12/1992 | Conner et al. | 361/679.09 |
| 5,631,852 | A | * | 5/1997 | Chen | 702/130 |
| 6,011,371 | A | * | 1/2000 | Van Brocklin et al. | 318/471 |
| 6,101,610 | A | * | 8/2000 | Beebe et al. | 713/323 |
| 6,134,667 | A | * | 10/2000 | Suzuki et al. | 713/300 |
| 6,522,535 | B1 | * | 2/2003 | Helot et al. | 361/679.49 |
| 7,428,650 | B2 | | 9/2008 | Kardach et al. | |
| 7,451,332 | B2 | | 11/2008 | Culbert et al. | |
| 2006/0197740 | A1 | * | 9/2006 | Xu et al. | 345/156 |
| 2010/0162007 | A1 | * | 6/2010 | Lu | 713/300 |
| 2010/0192149 | A1 | * | 7/2010 | Lathrop et al. | 718/1 |

* cited by examiner

*Primary Examiner* — Daniel Previl
(74) *Attorney, Agent, or Firm* — Moser Taboada

(57) ABSTRACT

A computer implemented method and apparatus for preventing overheating of a computer comprising sensing a disengagement action for the computer, detecting a power setting associated with the disengagement action, and performing, when the power setting is detected to be set to a preset mode, at least one of alerting the user regarding the power setting and forcing the computer into a low power state.

12 Claims, 6 Drawing Sheets

METHOD AND APPARATUS FOR PREVENTING OVERHEATING OF A COMPUTER

BACKGROUND OF THE INVENTION

1. Field of the Invention

Embodiments of the present invention generally relate to computing devices and, more particularly, to a method and apparatus for preventing overheating of a computer.

2. Description of the Related Art

For notebook computer devices, there tends to be a high disk failure rate due to overheating of the hard disk, the video card, the processor or other components. Very often a notebook computer user will change the default Windows power saving settings of his or her computer. One group of settings that is changed often is the power setting associated with the "Lid Close Action." This power setting is invoked upon closing the lid of the notebook computer. By default, usually the setting for "Lid Close Action—On Battery" and "Lid Close Action—Plugged In" are set such that when the lid is closed, the notebook computer is put into a "sleep" mode. The "sleep" mode is such that, when a user re-opens their notebook, there is no required wait time to start up the system software, or a very minimal amount of time to wait. Often times, a user will configure the laptop to "Do Nothing" when the notebook lid is closed. In the "Do Nothing" mode, the LCD display is powered off, so when a user reopens their notebook lid, no wait time is required. However, the CPU and the hard disk continue to operate when the lid is closed in "Do Nothing" mode and heat builds up causing detriment to the computer. This problem is exacerbated when a user carries the computer in a poorly ventilated bag. This situation eventually leads to hardware failure of the computer.

Many warnings given to users of Windows, for example, are given through the use of a balloon pop-up, with an appropriate message displayed in the balloon, in the notification area. But once the lid of the notebook is closed, the user is unable to see the pop-up warnings regarding overeating.

Therefore, there is a need in the art for a method and apparatus for preventing overheating of a computer.

SUMMARY OF THE INVENTION

Embodiments of the present invention comprise a computer implemented method and apparatus for preventing overheating of a computer comprising sensing a disengagement action for the computer, detecting a power setting associated with the disengagement action, and performing, when the power setting is detected to be set to a preset mode, at least one of alerting the user regarding the power setting or forcing the computer into a low power state.

Further embodiments of the present invention comprise a computing device for monitoring power management comprising an operating system, a sensor interface for receiving a signal of a sensor sensing a disengagement action, a detector, coupled to the sensor interface, for detecting a current power setting from a memory, an alert generator, coupled to the detector, for sending a message to the operating system when the current power setting is in a preset mode to alert a user and a power controller, coupled to the detector, for sending a message to the operating system when the current power setting is in a preset mode to set the current power settings to an ideal power settings.

BRIEF DESCRIPTION OF THE DRAWINGS

So that the manner in which the above recited features of embodiments of the present invention can be understood in detail, a more particular description of the invention, briefly summarized above, may be had by reference to typical embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a computer implemented method and apparatus for preventing overheating of a computer. In an exemplary embodiment, the present invention provides for sensing a user disengaging from a computer, detecting a power setting associated with the disengagement, and activating at least one indicator alerting the user of the currently configured power setting. Further, the present invention provides for alerting a user with at least an audio indicator or a visual indicator, and along with the alert, a power control module for at least one of shutting down or hibernating the computer to prevent overheating.

Figure 1:
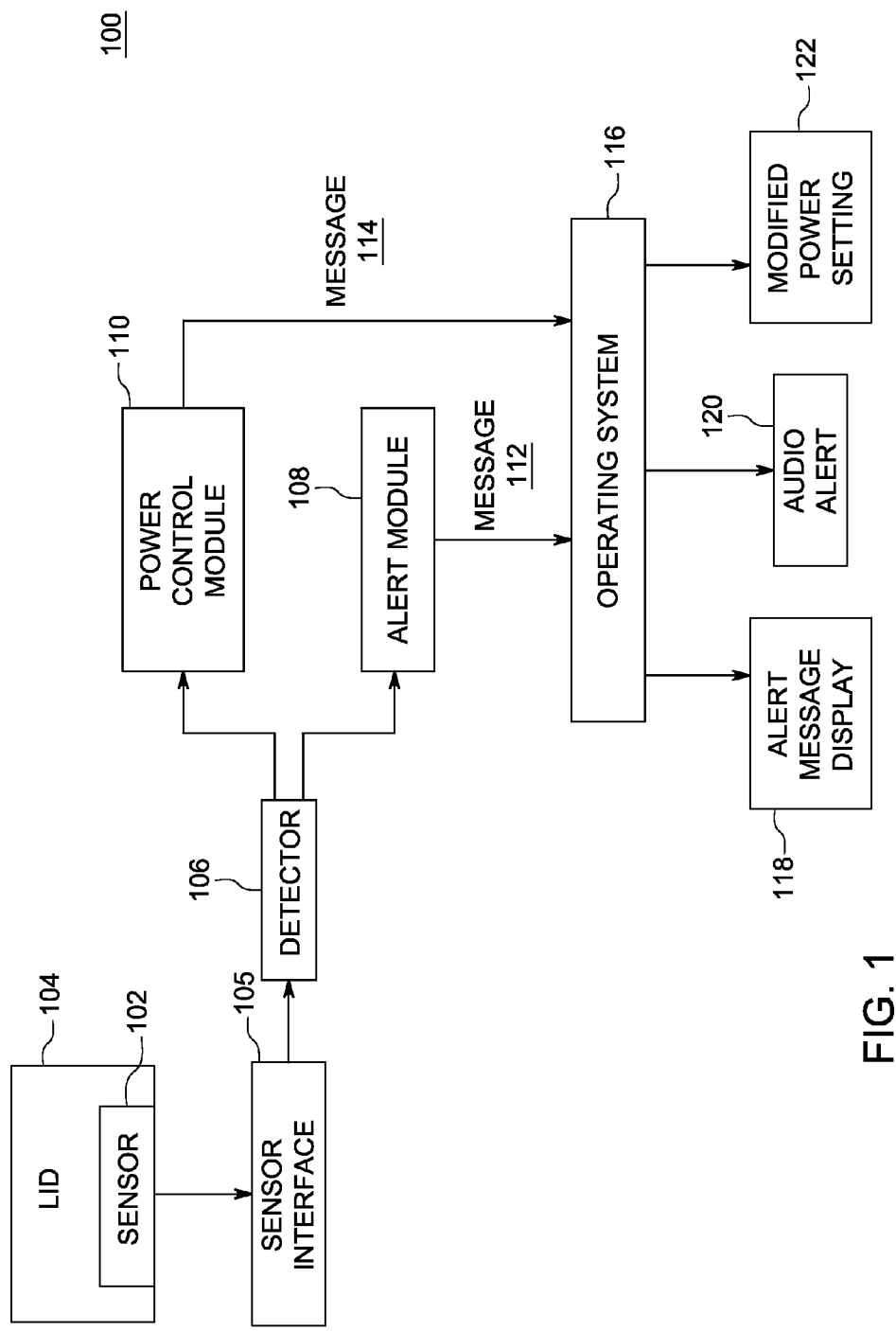
FIG. 1 is a functional diagram of an apparatus for preventing overheating of a computer according to an exemplary embodiment of the present invention.

FIG. 1 is a functional diagram of an exemplary embodiment of an apparatus 100 for preventing overheating of a computer in accordance with one or more embodiments of the present invention. The apparatus 100 comprises a sensor 102, a lid 104, a sensor interface 105, a detector 106, an alert module 108, a power control module 110, an operating system 116, an alert message display 118, an audio alert 120 and a modification of power settings 122.

In an exemplary embodiment, the sensor 102 senses whether the lid is closing or not through the use of light sensing. One of ordinary skill in the art will recognize that the present invention is not limited to a light sensor and the sensor 102 can be a mechanical sensor or the like. One of ordinary skill will also recognize that the sensor 102 is not limited to sensing lid closure, but any disengagement action performed by a user, such as pressing a power, sleep, or shut-down button, using a fingerprint reading device to sign off, and the like. The sensor interface 105 receives a signal from the sensor 102 and communicates to the detector 106 that the lid is closing. The detector 106 is configured to detect the power settings of the apparatus 100, i.e., whether the settings are set to "sleep" or "do nothing" for the lid close action. The detector 106 is in communication with both the alert module 108 and the power control module 110. In one exemplary embodiment, a user has configured the apparatus 100 such that only a visual or audio alert is sent to the user. In this exemplary embodiment, the detector 106 communicates with the alert module 108. The alert module 108 sends a message 112 to the operating system 116 indicating that an alert should be displayed or an audio alert should be sounded to the user regarding the current power settings. The operating system 116 renders an alert message display 118, sends an audio alert 120 to the user indicating that the power setting is set to "sleep" or "do nothing", or displays an alert 118 and sends an audio alert 120.

In another exemplary embodiment, the detector 106 communicates with the power control module 110. The power control module 110 sends a message 114 to the operating system 116. The message 114 consists of instructions requesting the operating system enter a different power setting mode, which may consist of at least "hibernate", "shut down", or the like. The operating system 116 will then set the power settings of the apparatus 100 to the modified power settings 122 contained in the message 114. The detector 106 can also communicate with both the alert module 108 and the power control module 110, such that the operating system 116 both causes an alert to displayed/sounded, as well as having the computer's current power setting set to "hibernate", "shut down", or the like.

Figure 2:
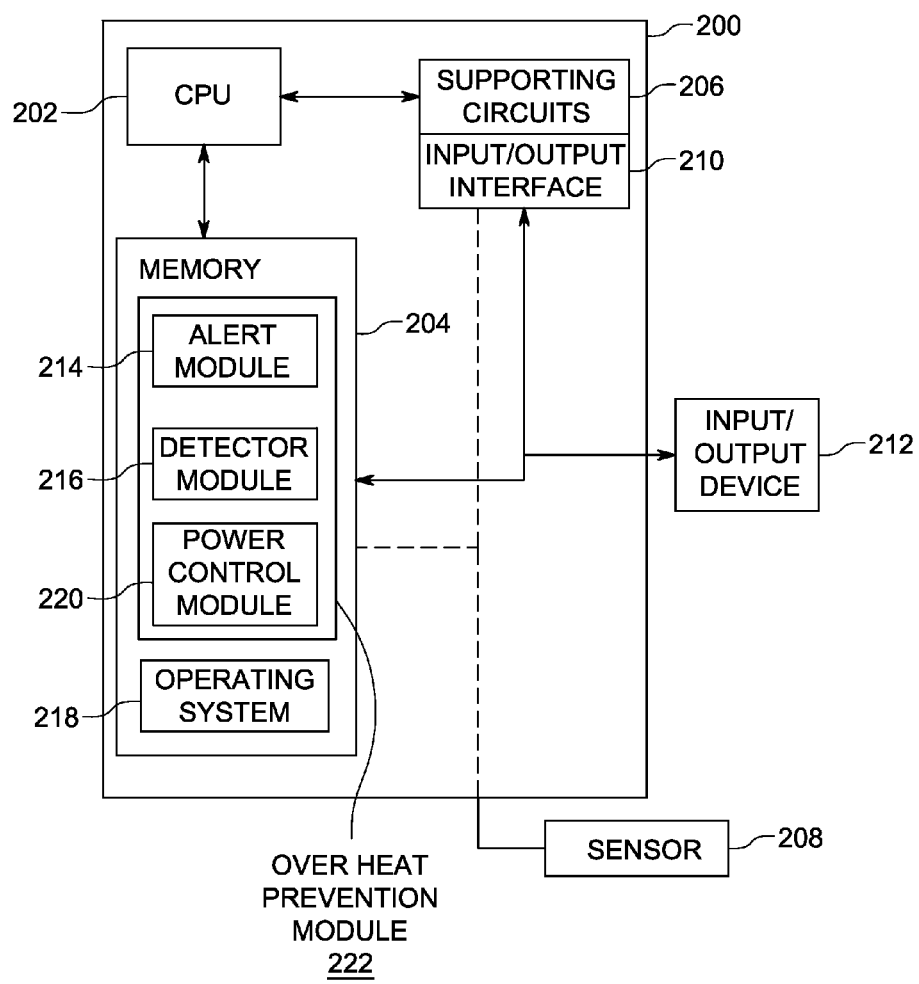
FIG. 2 is a block diagram of an exemplary implementation of the apparatus of FIG. 1 according to an exemplary embodiment of the present invention.

FIG. 2 is a block diagram depicting an exemplary embodiment of a computer system 200 in accordance with one or more aspects of the invention. The computer system 200 may be used to implement the apparatus 100 (shown in FIG. 1). The computer system 200 includes a processor 202, a memory 204, various support circuits 206, a sensor 208. The processor 202 may include one or more microprocessors known in the art. The support circuits 206 for the processor 202 include conventional cache, power supplies, clock circuits, data registers, I/O interfaces 210, and the like. The I/O interface 210 may be directly coupled to the memory 204 or coupled through the processor 202. The I/O interface 210 may also be configured for communication with input devices and/or output devices 212, such as, network devices, various storage devices, mouse, keyboard, speakers, display, sensors and the like. The computer system 200 is one embodiment of the present invention, but other electronic computing devices may also benefit from the invention. Such devices include, but are not limited to, laptop computers, notebook computers, cellular telephones, tablet devices, personal digital assistants and the like.

Figure 3:
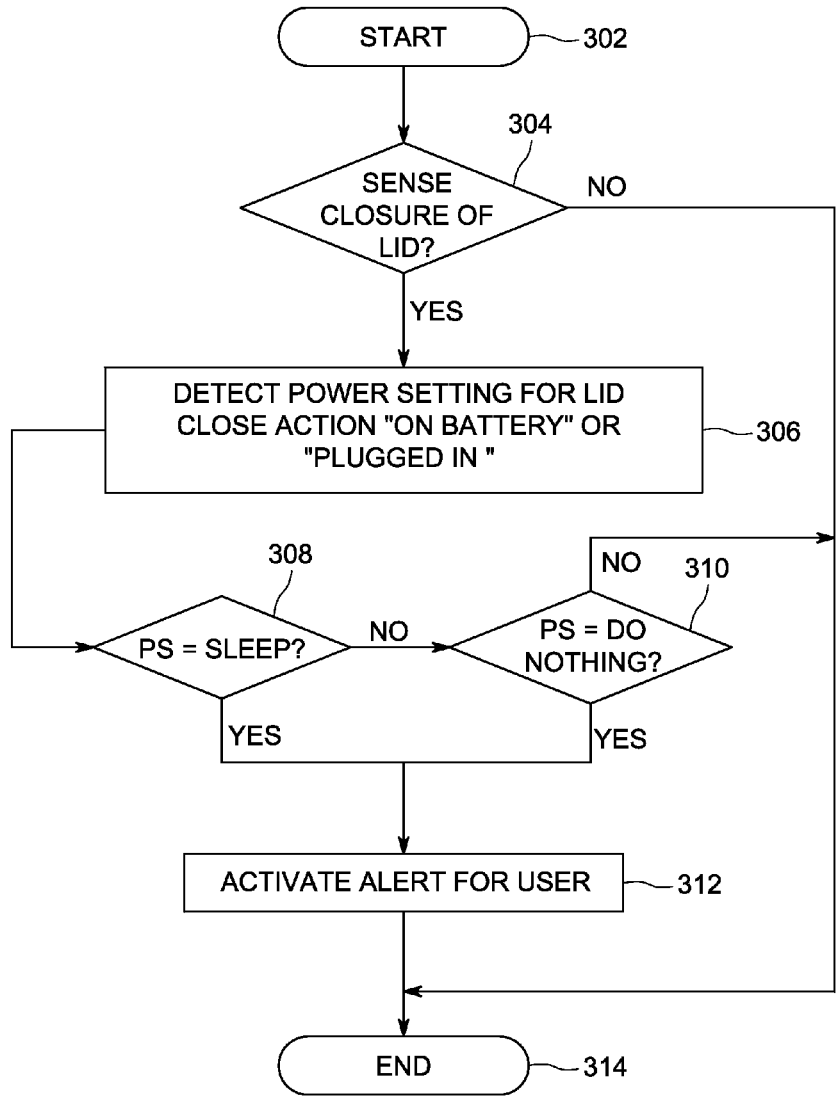
FIG. 3 is a flow diagram of a method for preventing overheating of a computer according to one exemplary embodiment of the present invention.

The memory 204 stores processor-executable instructions and/or data that may be executed by and/or used by the processor 202. These processor-executable instructions may comprise firmware, software, and the like, or some combination thereof. Modules having processor-executable instructions that are stored in the memory 204 comprise an overheating prevention module 222. The overheating prevention module 222 comprises an alert module 214, a detection module 216 and a power control module 220, whose operation is depicted in FIG. 3 and described below. The computer system 200 may be programmed with one or more operating systems (generally referred to as operating system (OS)) 218, which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 218 may be disposed in the memory 204. The memory 204 may include one or more of the following random access memory, read only memory, magneto-resistive read/write memory, optical read/write memory, cache memory, magnetic read/write memory, and the like, as well as signal-bearing media.

FIG. 3 is a flow diagram of a method for preventing overheating of a computer in accordance with one embodiment of the present invention. FIG. 3 represents operation of the apparatus 100 as implemented in the computer system 200. According to FIG. 3, the method 300 begins at step 302 and proceeds to step 304. At step 304, the sensor 102 senses the closure of the notebook lid 104 through the use of a light sensor or other types of sensors well known in the art. If no closure is detected, the method proceeds to end at step 314. If closure of the lid is detected, then the method proceeds to step 306, where the power setting for the "Lid Close Action—On Battery" or the "Lid Close Action—Plugged in" is detected from memory 204. At step 308, the power setting is then compared to determine if it is set to "sleep." If the power setting is set to sleep, the method 200 activates an alert to the user about the power setting at step 312. If the power setting is not in "sleep" mode, it is determined whether the power setting is in "do nothing" mode at step 310. If the power setting is in "do nothing" mode, then the method 200 activates an alert to the user about the power setting at step 312. The method ends at step 314. The alert is at least one of a visual alert in the form of an operating system prompt or pop-up, an audio alert sounding from the computer, or a combination thereof. One of ordinary skill in the art would recognize that alerting of a user is not limited to these embodiments.

Figure 4:
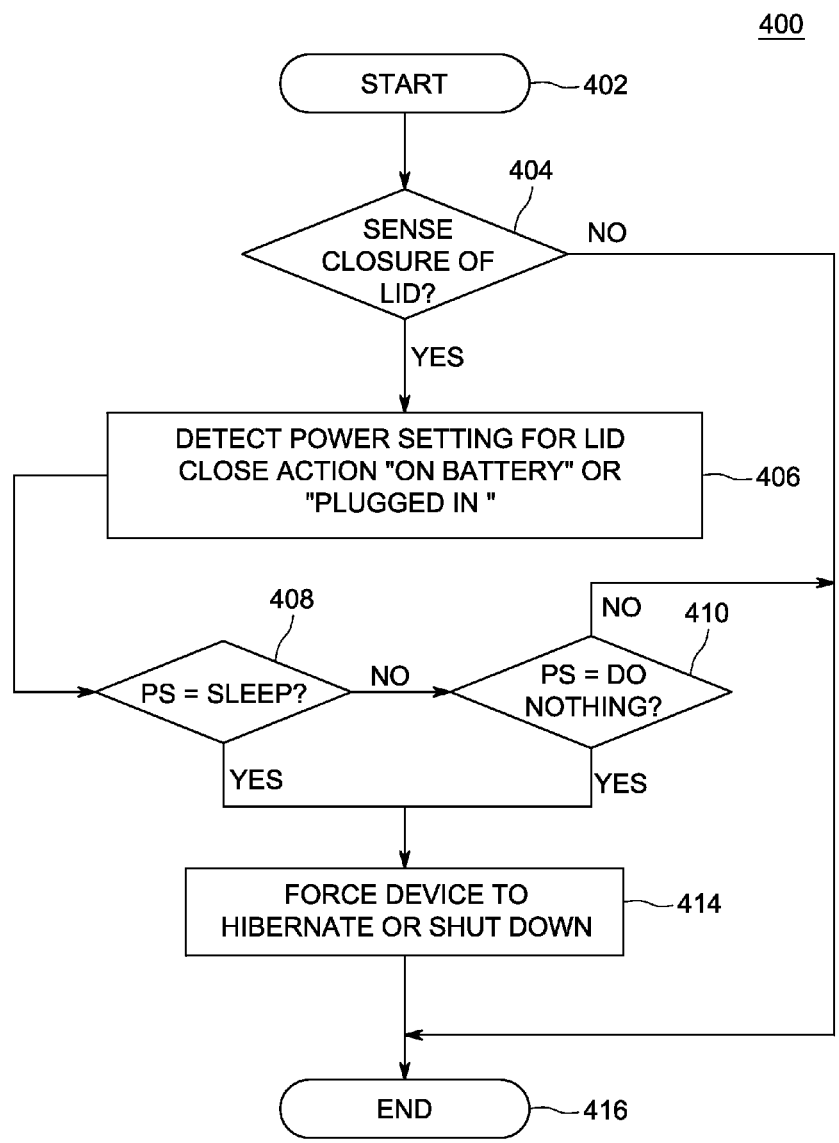
FIG. 4 is a flow diagram of a method for preventing overheating of a computer according to another exemplary embodiment of the present invention.

FIG. 4 is a flow diagram of a method for preventing overheating of a computer in accordance with one embodiment of the present invention. FIG. 4 represents operation of the apparatus 100 as implemented in the computer system 200, where the overheating prevention module 220 is stored in memory 204 and executed by the processor 202. The method 400 begins at step 402 and proceeds to step 404. At step 404, the sensor 102 senses if the notebook lid is being closed through the use of a light sensor, or other types of sensors known in the art. If the lid is not closing, the method proceeds to end at step 416. If the lid is closing, the method proceeds to step 406, where the power setting for the "Lid Close Action—On Battery" or the "Lid Close Action—Plugged in" is detected from memory 204. At step 408, the power setting is then compared to determine if it is set to "sleep." If the power setting is set to sleep, then the power control module 220 forces the apparatus 100 to "hibernate", "shut down", or the like in step 414. If the power setting is not in "sleep" mode, it is determined whether the power setting is in "do nothing" mode at step 410. If the power setting is in "do nothing" mode, then the power control module 220 forces the apparatus 100 to "hibernate", "shut down", or the like in step 414. The power settings are stored in memory, thus a user can set the computer to shut down, hibernate, and the like as desired. If the user would like a shorter start-up time for the computer, then they choose the "hibernate" option. If the user would like the best overheating prevention, then the user chooses the "shut-down" option. The present invention is not limited to these power settings and a user can preset any power setting for preventing overheating that they prefer. The method ends at step 416.

Figure 5:
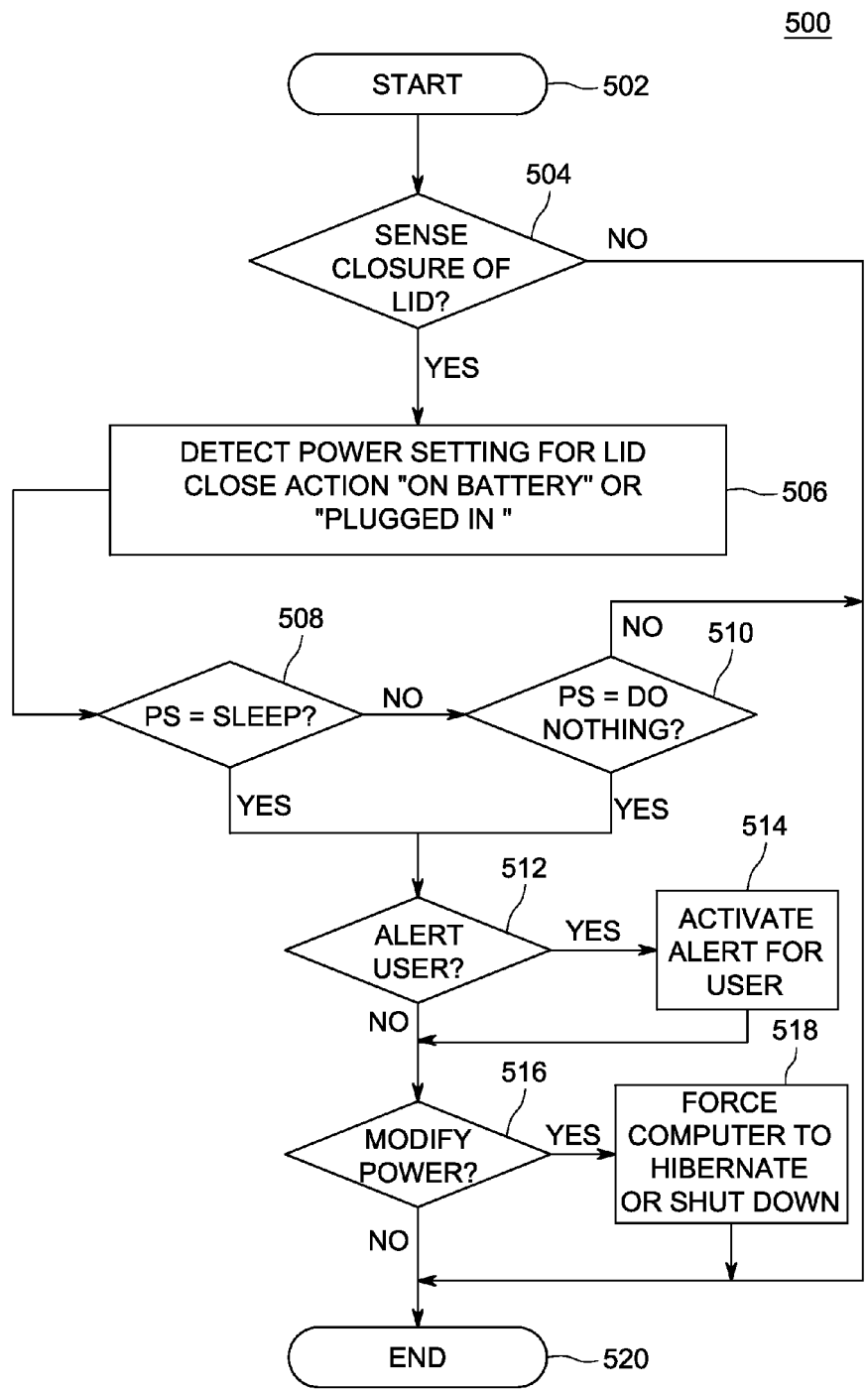
FIG. 5 is a flow diagram of a method for preventing overheating of a computer according to another exemplary embodiment of the present invention.

FIG. 5 is a flow diagram of a method for preventing overheating of a computer in accordance with one embodiment of the present invention. FIG. 4 represents operation of the apparatus 100 as implemented in the computer system 200, where the overheating prevention module 220 is stored in memory 204 and executed by the processor 202. The method 500 begins at step 502 and proceeds to step 504. At step 504, the sensor 102 senses if the notebook lid is being closed through the use of a light sensor, or other types of sensors known in the art. If the lid is not closing, the method proceeds to end at step 520. If the lid is closing, the method proceeds to step 506, where the power setting for the "Lid Close Action—On Battery" or the "Lid Close Action—Plugged in" is detected from memory 204. At step 508, the power setting is then compared to determine if it is set to "sleep." If the power setting is set to sleep, then at step 512 it is determined whether the computer has been configured to alert the user of the power settings. If alert is configured, then the method proceeds to step 514, where the method 500 activates an alert to the user about the power setting.

Where the method determines the alert is not configured, or that the alert has been active, the method proceeds to step 516 to determine whether power modification has been configured. Where power modification is configured, at step 518, the power control module 220 forces the apparatus 100 to "hibernate", "shut down" or the like, as per user configuration. The method ends at step 520.

Figure 6:
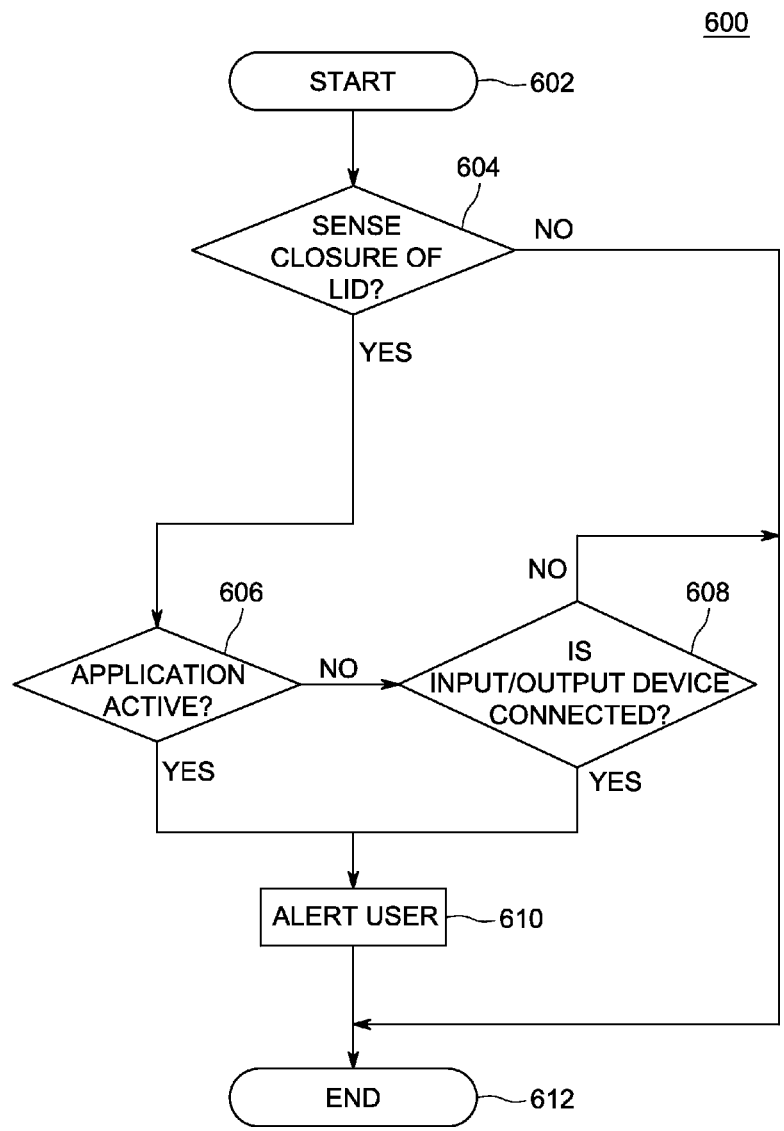
FIG. 6 is a flow diagram of a method for preventing overheating of a computer according to another exemplary embodiment of the present invention.

FIG. 6 is a flow diagram of a method for preventing overheating of a computer in accordance with one embodiment of the present invention. FIG. 6 represents operation of the apparatus 100 as implemented in the computer system 200. According to FIG. 6, the method 600 begins at step 602 and proceeds to step 604. At step 604, the sensor 102 senses the closure of the notebook lid 104 through the use of a light sensor or other types of sensors well known in the art. If no closure is detected, the method proceeds to end at step 612. If closure of the lid is detected, then the method proceeds to step 306, where the detector determines whether at least one application is still actively running. The method 600 activates an alert to the user about the actively running application at step 610. Where an application is not actively running, the method proceeds to step 608. At step 608, the method determines whether an I/O device is connected to the apparatus 100. The method 600 activates an alert to the user at step 610 if an I/O device is still connected. The method ends at step 612 if no application is actively running and no I/O device is connected. The alert is at least one of a visual alert in the form of an operating system prompt or pop-up, an audio alert sounding from the computer, or a combination thereof.

In another exemplary embodiment, the steps 402, 502 and 602 for "sensing closure of the lid" can be set to a user pre-configured action, such as pressing a power button, pressing a pause button, waving a hand across a sensor and the like in other exemplary embodiments of the invention. The present invention does not limit the type of disengagement action the user takes to end use of the computer and those of ordinary skill in the art would recognize that a disengagement action is not limited to lid closure.

Another exemplary embodiment of the present invention operates such that instead of shutting down the computer when the lid closure is detected, the hard drive is spun down to a low power state or the processor is powered down to a low power state. One of ordinary skill in the art would recognize that the present invention is not limited to specific hardware or software to be powered down to prevent overheating, but can apply to many different pieces of hardware or software.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for preventing overheating of a notebook computer comprising:
   sensing a disengagement action for the notebook computer;
   detecting a power setting associated with the disengagement action, wherein the disengagement action comprises one or more of partial lid closure of the notebook computer, user logoff from the notebook computer, and depressing a button indicating disengagement with the notebook computer; and
   alerting, when the power setting is detected to be set to "sleep" or "do nothing,", the user regarding the power setting to make the user aware that the power setting may degrade the notebook computer if the power setting is not modified to a low power setting.

2. The method of claim 1, further comprising alerting the user by at least one of an audio sound, an operating system prompt, or a combination thereof.

3. The method of claim 1, wherein the low power state comprises at least one of a "shut down" state and a "hibernate" state.

4. The method of claim 1 wherein the component is at least one of a hard disk, a processor and a video card.

5. The method of claim 1 wherein all of the components of the computer are put into a low power state.

6. A notebook computing device for monitoring power management comprising:
   an operating system installed in memory of the notebook computing device;
   a sensor interface for receiving a signal of a physical sensor of the notebook computing device sensing a disengagement action from the notebook computing device;
   a detector, coupled to the sensor interface, for detecting a power setting associated with the disengagement action, wherein the disengagement action comprises one or more of partial lid closure of the notebook computing device, user logoff from the notebook computing device, and depressing a button indicating disengagement with the notebook computer;
   an alert generator, coupled to the detector, for sending a message to the operating system when the current power setting is detected to be "sleep" or "do nothing"; and
   a power controller, coupled to the detector, for sending a message to the operating system when the current power setting is detected to be "sleep" or "do nothing" to set the current power settings to an ideal power settings.

7. The device of claim 6, wherein the alert generator alerts the user by at least one of an audio sound and an operating system prompt.

8. The device of claim 6, wherein the ideal power setting comprises at least one of a "shut down" state or a "hibernate" state.

9. A computer readable medium for storing software that, when executed by a computer, causes a notebook computing device to:
   sense a disengagement action for the notebook computing device;
   detect a power setting associated with the disengagement action associated with the disengagement action, wherein the disengagement action comprises one or more of partial lid closure of the notebook computer, user logoff from the notebook computer, and depressing a button indicating disengagement with the notebook computer; and alert, when the power setting is detected to be set to "sleep" or "do nothing", the user regarding the power setting to make the user aware that the power setting may degrade the notebook computing device if the power setting is not modified to a low power setting and force the device into a low power state when a disengagement action is sensed.

10. The computer readable medium of claim 9 further causes the device to determine at least one of whether one or more applications are still running and whether one or more I/O devices are connected to the computer.

11. The computer readable medium of claim 9, further comprising alerting the user by at least one of an audio sound, an operating system prompt, or a combination thereof.

12. The computer readable medium of claim 9, wherein the low power state comprises at least one of a "shut down" state and a "hibernate" state.

\* \* \* \* \*